United States Patent [19]
Shaw

[11] 3,916,706
[45] Nov. 4, 1975

[54] MOWER DRIVE SHAFT AND PULLEY
[75] Inventor: Thomas E. Shaw, Grandville, Mich.
[73] Assignee: C. L. Frost & Son, Inc., Grand Rapids, Mich.
[22] Filed: Nov. 28, 1973
[21] Appl. No.: 419,701

[52] U.S. Cl................ 74/230.01; 74/230.8
[51] Int. Cl................ F16h 55/36; F16h 55/34
[58] Field of Search.......... 74/230.01, 230.4, 230.8; 56/256, 17.5

[56] References Cited
UNITED STATES PATENTS
1,832,871  11/1931  Meyer...................... 74/230.01 X
3,071,980  1/1963  Brewer...................... 74/242.1 R
3,286,539  11/1936  Loper et al. .................. 74/230.4

*Primary Examiner*—Leonard H. Gerin
*Attorney, Agent, or Firm*—Price, Heneveld, Huizenga & Cooper

[57] ABSTRACT

A rotatable shaft is mounted in a housing secured to the mower deck. The drive pulley is positionable on the upper end of the shaft in two preselected spacings from the flange. The hub of the pulley extends dissimilar lengths to each axial side of the pulley such that the selection of which side of the pulley is installed first onto the shaft selects and indexes the pulley spacing from the deck.

6 Claims, 2 Drawing Figures

MOWER DRIVE SHAFT AND PULLEY

BACKGROUND OF THE INVENTION

This invention relates to rotary mowers and particularly, drive shaft and drive pulley assemblies.

In a conventional rotary mower, the blade drive shaft is belt driven, there being a pulley attached to the upper end of the drive shaft. The shaft and its housing are generally mounted to the deck of the mower frame by a bracket or flange anchored to the housing. Different models and types of mowers require different spacings between the plane of the pulley and the mower deck. Heretofore, different pulleys and/or shafts were required for each model type thereby increasing costs considerably since an essentially similar model type (but for the spacing requirement) required two separate sets of pulleys and/or shafts depending on the spacing requirement. This reduced the overall production volume of each pulley and required separate packaging, identification and billing requirements. All of these factors boosted the overall production and handling costs right on up to the finished assembly. Thus, there is a need in this art for a pulley and shaft assembly which is reversable to permit two different preselected spacings of the same pulley on the same shaft from the mower deck.

SUMMARY OF THE INVENTION

In accordance with the invention, a mower drive shaft and pulley assembly includes a shaft housing attached to the deck of the mower the shaft extending thereabove a preselected distance. The pulley has a hub extending dissimilar lengths to each axial side of the pulley so that depending on its orientation when installed on the upper end of the shaft, the pulley is indexed relative the mower deck at two different optional but preselected spacings.

The advantages of Applicant's invention are significant. The concept within the combination of the mower, its drive shaft and deck arrangement eliminates the necessity of frabricating an additional sized part as a result of the reversibility feature and its resultant location and indexing of the pulley at precisely one of two selected distances from the mower deck. Less labor is required since there can be no confusion between one of the two heretofore required pulleys required in a given mower set-up.

DESCRIPTION OF THE PREFFERED EMBODIMENT

Figure 1:
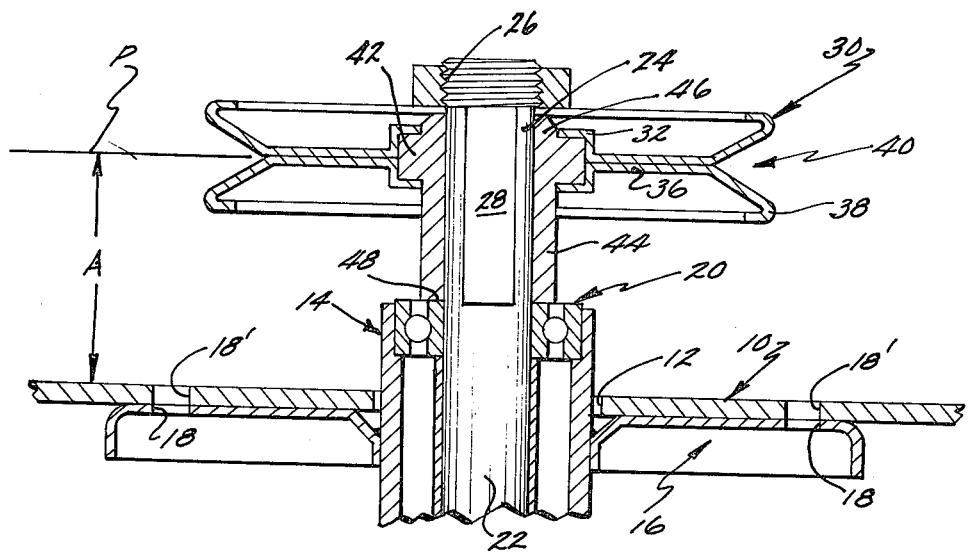
FIG. 1 is a fragmentary side elevation view of a rotary mower, drive shaft and drive pulley assembly illustrating the hub of the pulley mounted in one fashion.

Referring now to the drawings in detail, FIG. 1 illustrates a fragmentary portion 10 of a mower deck having an opening 12 through which is mounted a drive shaft housing 14. A deck bracket 16 is welded or otherwise anchored to shaft housing 12 and includes openings 18 alignable with complementary openings 18' on the mower deck to permit positive securement of the deck bracket 16 and associated shaft housing to the mower deck.

A bearing 20 is secured in the upper end of housing 14 and a similar type bearing is also secured in the lower portion of the shaft housing (not shown) so that the mower blade drive shaft 22 is rotatably mounted in shaft housing 12. The upper end 24 of shaft 22 extends a distance above housing 14 and the deck 10 to which it is attached and includes a threaded terminal portion 26. The upper end 24 also includes one or more flatted portions 28.

A pulley 30 is secured to the upper end of shaft 22, the pulley including a hub portion 32, web portion 36 and rim portion 38. The rim portion includes a belt-receiving groove 40 in which a belt (not shown) is positioned for driving the pulley, associated shaft and mower blade for operation of the mower. A hub member 42 is secured in the hub portion 32 and has a complementary flat shoulder formed in the opening which matches the flat 28 so that when the pulley is mounted on the upper end of shaft 22, the pulley and shaft are locked against counter-rotation relative each other. A pair of flatted portions or other locking means such as a key-way could also be utilized.

Hub member 42 is nonsymmetrical with respect to its axial length relative the plane P of the pulley. That is, one end 44 of hub member 42 extends a distance greater from the plane P of the pulley than the other end 46. Either of the pulley ends and its associated hub member 42 however is designed for positioning over the outer end of shaft 22 from either side. When positioned in the fashion illustrated in FIG. 1, the outermost portion 48 of end 44 abuts against bearing 20 indexing the hub member 42 and associated pulley a defined distance A from the mower deck 10.

Figure 2:
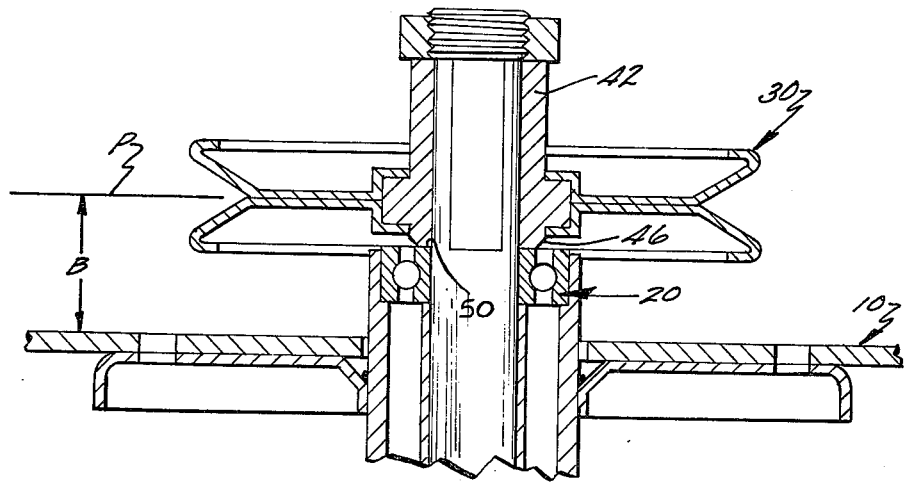
FIG. 2 is a view similar to FIG. 1 with the pulley mounted in the opposite fashion.

Referring to FIG. 2, if the pulley 30 is inserted over the upper end of shaft 22 from the other side, the outer end 50 of end portion 46 of hub member 42 abuts against bearing 20 locating the pulley 30 in closer proximity to deck 10 a preselected second distance B. Thus, pulley 30 can be positioned such that the belt-receiving groove 40 is indexed at two preselected distances A or B from the mower deck 10 without requiring the fabrication of two different pulleys or two different shafts. In each case, the pulley 30 is shown to be anchored to shaft 22 by a nut 52 threaded upon the outer end of shaft 22 although other forms could be used.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A rotary mower comprising, in combination: a rotatable shaft mounted in bearings, a housing for said shaft and bearings; a deck support on said housing for mounting said shaft and housing to a mower deck; means for attaching a drive pulley to one end of said shaft; and a drive pulley receivable on said one end of said shaft, said drive pulley having a hub engageable with said one end of said shaft, said hub member extending dissimilar axial lengths to each side of said pulley whereby said hub and pulley are positionable on said shaft in two selected positions wherein said pulley may be located in two preselected distances from said mower deck when mounted on said shaft.

2. The rotary mower according to claim 1 wherein said hub member abuts a portion of said shaft housing and bearing assembly when positioned on said shaft to provide a positive index of said pulley a preselected distance from said mower deck.

3. The rotary mower according to claim 2 wherein the end of said hub member abuts one of said bearings.

4. The rotary mower according to claim 2 wherein said shaft and pulley includes cooperative means preventing joint rotation relative each other when said pulley is mounted on said shaft.

5. A rotary mower system comprising, in combination: a mower frame including a deck; a rotatable shaft housing having mounted therein bearings at each end for receiving a rotatable shaft; said shaft housing being secured to and extending through said mower deck with an upper portion extending above said mower deck, said shaft being mounted in said housing and extending above said housing; and a drive pulley secured to the upper end of said shaft for driving a mower blade secured to the lower end of said shaft, said pulley including a hub member extending dissimilar lengths in an axial direction to each side of said pulley whereby said pulley is affixed to said shaft in reversible positions wherein said pulley is positioned at a first preselected distance from said mower deck when positioned in one fashion and positioned at a second preselected distance from said mower deck when positioned on said shaft in the other fashion.

6. The rotary mower system according to claim 5 wherein said hub member abuts a portion of said shaft housing and bearing assembly when positioned on said shaft to positively index said pulley in one of said preselected positions.

* * * * *